United States Patent [19]

Saunders et al.

[11] Patent Number: 4,974,439
[45] Date of Patent: Dec. 4, 1990

[54] CONTROLLED TRANSFER OF SHEET METAL CAN BODIES IN CAN BODY LINE

[76] Inventors: William T. Saunders, 1327 Overlook Dr.; Robert L. Applegate, R.D. #3, Box 322, both of Weirton, W. Va. 26062

[21] Appl. No.: 214,399

[22] Filed: Jul. 1, 1988

[51] Int. Cl.⁵ .............................................. B21D 43/18
[52] U.S. Cl. ........................................ 72/361; 72/346; 72/426; 414/751
[58] Field of Search ............... 72/361, 346, 426, 345, 72/344, 421, 422; 413/46; 29/DIG. 105; 198/468.5; 414/225, 751, 752

[56] References Cited

U.S. PATENT DOCUMENTS

| | | | |
|---|---|---|---|
| 3,087,629 | 4/1963 | Sharpe | 198/468.5 |
| 3,951,274 | 4/1976 | Yamamoto | 414/752 |
| 3,966,039 | 6/1976 | Kurzweil | 198/468.5 |
| 4,203,313 | 5/1980 | Vandlik | 72/361 |
| 4,566,306 | 1/1986 | Orii | 72/426 |
| 4,589,819 | 5/1986 | Shirao | 414/752 |
| 4,653,635 | 3/1987 | Ducate, Sr. | 198/468.5 |
| 4,732,031 | 3/1988 | Bulso et al. | 72/348 |
| 4,784,562 | 11/1988 | Kishi et al. | 414/225 |

FOREIGN PATENT DOCUMENTS

| | | | |
|---|---|---|---|
| 1029331 | 5/1958 | Fed. Rep. of Germany | 72/426 |
| 1240488 | 6/1986 | U.S.S.R. | 72/345 |
| 1274825 | 12/1986 | U.S.S.R. | 72/426 |

Primary Examiner—Robert L. Spruill

[57] ABSTRACT

Apparatus which eliminates mechanically-moving parts for clasping or releasing a sheet metal can body for moving a can body from a forming station and, which reduces the number of moving parts as well as the type of movements required by such transfer apparatus to enable sheet metal can bodies to be transferred rapidly, in synchronism with movements of tooling in a forming press without damage to sheet metal or coating while controlling orientation and stability of the can body. A shuttle-arm oscillates in the longitudinal direction of the can line, into and out of the area of the press tooling to transfer a can body for continued movement in the line; such shuttle arm moves at a rate which does not obstruct any movement of the forming tooling or the operating rate of the press. A formed can body is attracted to and physically held at the leading end of the shuttle arm in desired orientation without mechanical movement clamping of any type by a stacked array of permanent magnets and flux path bars. Movement of the shuttle arm longitudinally in relation to a wiper-arm separates the can body at a desired location without requiring separate mechanical moving parts. Such flux path bars present a surface which matches a portion of the contour of the can body. A rigid-holding capability, with desired stability and orientation are provided.

17 Claims, 4 Drawing Sheets

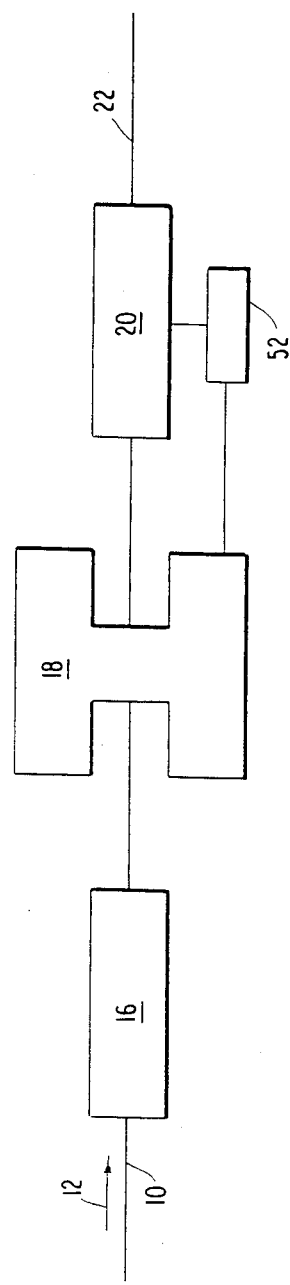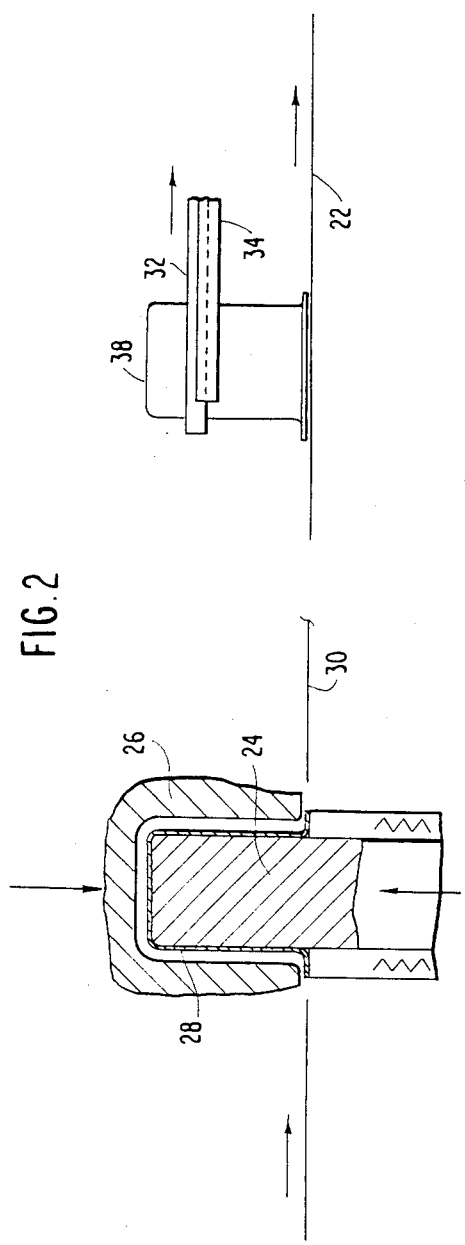

CONTROLLED TRANSFER OF SHEET METAL CAN BODIES IN CAN BODY LINE

This invention relates to transfer of sheet metal can bodies in a production line while controlling orientation of such can bodies. More particularly, this invention is concerned with: eliminating mechanically-moving parts of the type previously used for purposes of clasping or releasing the can body during transfer in a can making line; minimizing moving parts to provide a fast-acting apparatus for carrying out such transfer without impeding the operating rate of a forming press or its tooling; and, enabling transfer of each such can body, rigidly held and properly oriented, without damage to the can body or its coating, to a location remote from such tooling for continued handling or processing.

In the prior practice, transfer of work product in a production line relied on a "box-type" oscillating transfer system described, for example, in "Metals Handbook," 8th Ed., Vol. 4, "FORMING," pages 11, 12, American Society for Metals, Metals Park, Ohio 44073. With such apparatus, finger-like members, which provide for clasping and releasing a work product are mounted on an oscillating carriage. The carriage moves longitudinally in the processing line between a work station and an unloading station. The clasping members generally are pivotally mounted so as to have a lateral direction movement in relation to the line for purposes of clasping a workpiece on its opposite lateral sides. The carriage then moves the workpiece in the longitudinal direction; lateral movement of the clasping members is again required for release of the workpiece; and, then the carriage and clasping members are returned longitudinally to the loading station for repetition of the cycle.

Any of the prior art apparatus required repeated starting and stopping of a plurality of moving parts during a single cycle and multi-directional movements, both lateral and longitudinal, of multiple component parts. Such multi-directional and multi-element movement systems seriously limited the operating rate of high-speed presses and their tooling systems because, as taught herein, the number and complexity of the required mechanical movements of the transfer apparatus were significantly greater than those of the tooling.

Important contributions of the present teachings eliminate any need for any type of mechanical-movement clamping means for the work product, and, minimize the number of moving parts required as well as limit the type of movement thereof. As a result, the movement of the transfer apparatus of the present invention can be readily coordinated and synchronized with the tooling system stroke, and the tooling system stroke rate need no longer be limited by the rate at which the transfer apparatus can be operated.

With the synchronism provided, the maximum stroke rate is determined by parameters of the press or tooling system; not by operating limitations of a transfer apparatus.

The present transfer apparatus for sheet metal can bodies enables use of a single moving element with its major component of movement being in the longitudinal direction of the can line. Also, the invention provides for controlling the stability and orientation of a can body as transferred along the production line from the vicinity of the tooling stroke. The can body is rigidly held without relying on mechanically movable clamping means, notwithstanding rapidly accelerating movement from the vicinity of the tooling to a transfer station remote from movements of the forming tooling of the press.

Such advantages and contributions are considered in more detail in describing the invention as represented by the accompanying drawings; in which:

FIG. 1 is a box-diagram illustration of a can body processing line for purposes of describing functions of the invention;

FIG. 2 is a schematic view in elevation, partially in cross section and with portions removed, showing a portion of a can body line in which forming press tooling is completing formation of a can body while a portion of the can body transfer apparatus of the invention is shown separating a previously formed can body prior to return to the vicinity of the press tooling for transfer of the can body being formed by such tooling;

Figure 3:
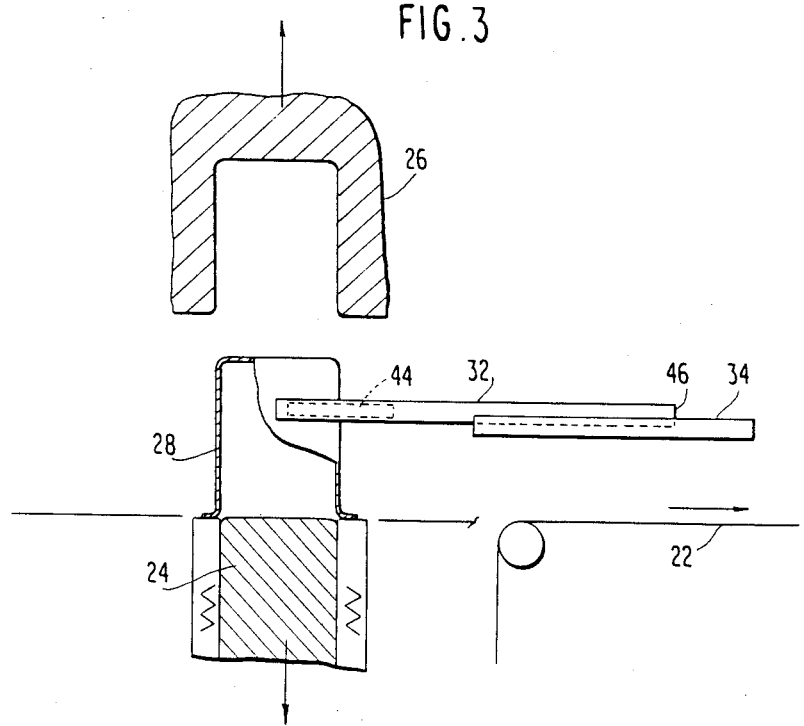
FIG. 3 is a schematic view in elevation, partially in cross section, of the apparatus of FIG. 2, shown in a cycle sequence subsequent to that of FIG. 2.

The direction of movement of work product along a longitudinally directed travel path 10 (FIG. 1) is indicated by arrow 12. Feed means 16 directs work product into forming press 18. Transfer apparatus 20 of the present invention removes a can body from the vicinity of the press tooling and delivers it, for movement in the longitudinal direction of the can line, onto conveyor 22. Operation of the transfer apparatus is synchronized with operation of the tooling system.

In general, fabricating tooling moves in a direction which is transverse to the longitudinal direction of movement of can bodies in the pass line. In the elevational view of a horizontal travel path embodiment shown in FIG. 2, draw punch 24 reaches the top of its vertical stroke in relation to draw cavity tooling 26 as the latter may also be at or near the end of its stroke. The can body forming portion of the stroke is complete or near completion, however, the can body cannot be transferred until the forming press tooling has been withdrawn from within and about such can body so as to enable, in the embodiment shown, the can body 28 to move along the pass line 30.

In accordance with present synchronization teachings, as such tooling stroke is being completed, cup transfer shuttle arm 32 can be moving toward its retracted position. The retraction direction of movement of shuttle arm 32, relative to wiper arm 34, separates can body 38 (which was formed in the previous cycle) from shuttle arm 32 at a location longitudinally removed from tooling system movements of the press. Movement of cup 38 onto a conveyor enables return of shuttle arm 32 to the vicinity of the press tooling to complete a transfer cycle.

Start of a transfer sequence is shown in FIG. 3 in which the forming tooling 24 and 26 have been withdrawn in a direction transverse to the pass line, leaving the formed can body 28 in a position to be transferred from the vicinity of the press tooling. Transfer shuttle arm 32 has moved to its forward position for such transfer.

Figure 4:
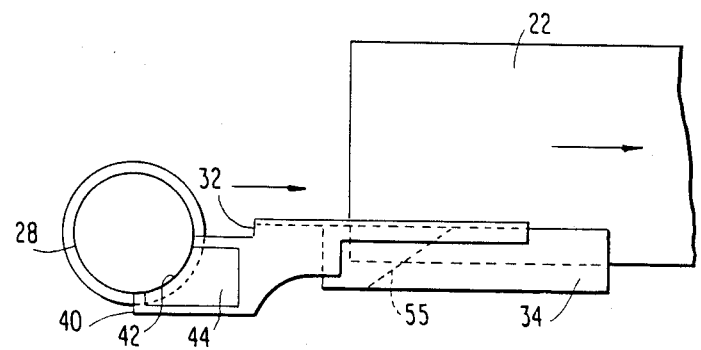
FIG. 4 is a top-plan schematic view of the apparatus of FIG. 3.
Figure 5:
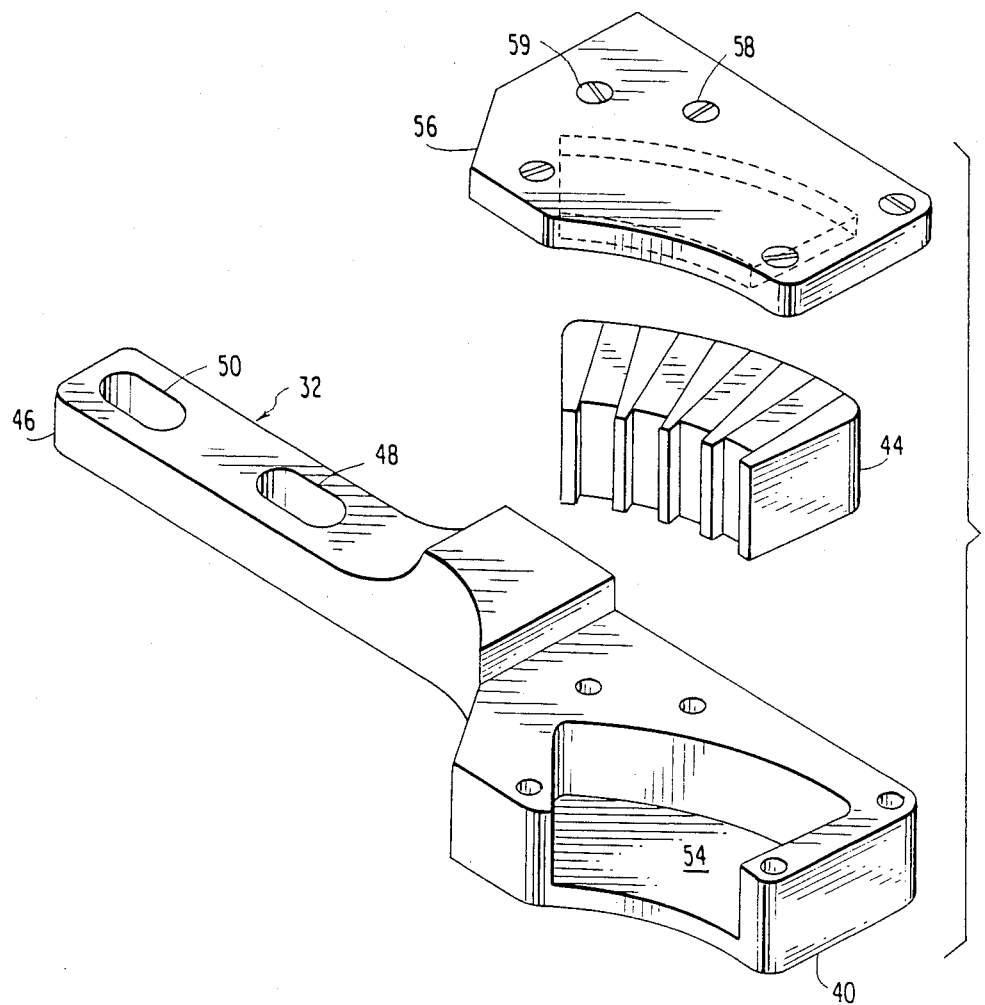
FIG. 5 is a perspective pre-assembly view of shuttle arm means of the invention.
Figure 6:
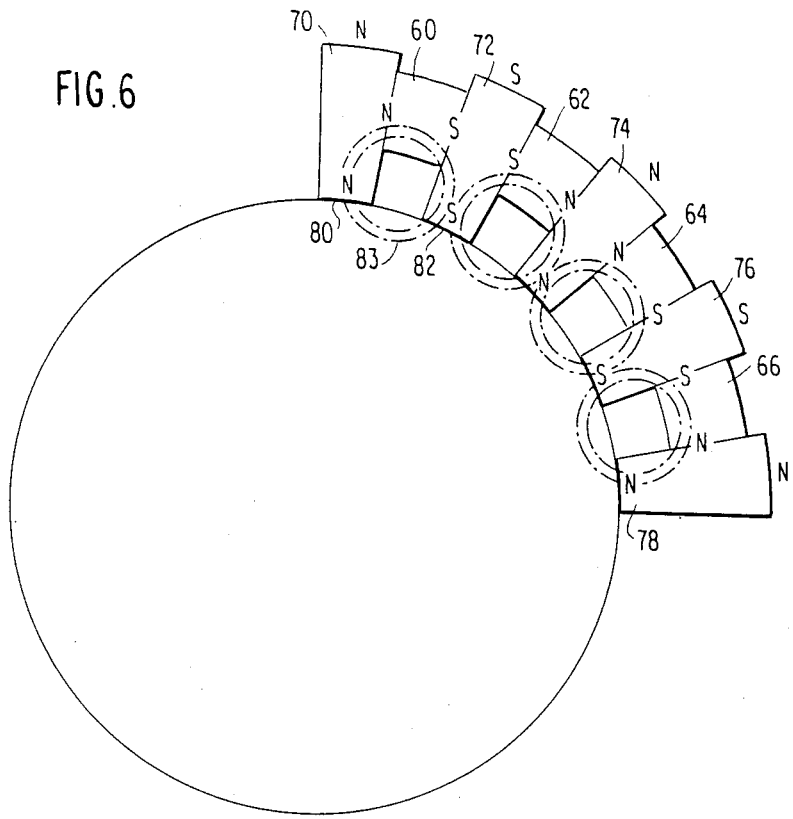
FIG. 6 is a detailed view of a specific embodiment of an energy source array for attracting a steel can body to such shuttle arm means, holding such can body rigidly, and transferring such can body free of any mechanical-movement clamping means.

The can body 28, as shown in FIGS. 3 and 4, is contiguous to leading end 40 of shuttle arm 32. As best seen in FIGS. 4, 5 and 6, a portion of the outer periphery of each can body being fabricated (such as 28). A curvilinear configuration surface 42, as defined by a saddle block means 44 which is located contiguous to the leading end 40 of shuttle arm 32, has a contour which matches at least a portion of the peripheral surface of can body 28.

Figure 7:
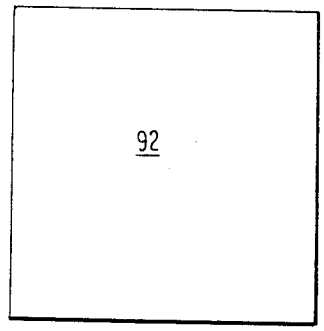
FIG. 7 is a plan view of a permanent magnet used in a specific embodiment of the invention of FIG. 6.
Figure 8:
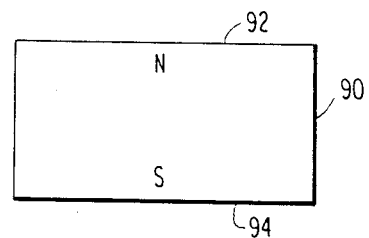
FIG. 8 is an elevational view of the magnet of FIG. 7.

Details of the shuttle arm 32, and saddle block means 44 for attracting and holding a formed can body to such leading end of the shuttle arm, are shown in the isometric pre-assembly view in FIG. 5; and further details of a specific embodiment of the saddle block 44 are shown in FIGS. 6, 7 and 8.

Referring to the shuttle arm 32 shown in FIG. 5, in approaching the trailing end 46, which is longitudinally opposite to its leading end 40, mechanicalconnector apertures 48 and 50 are provided for connecting shuttle arm 32, e.g. through linkage means 52 shown schematically in FIG. 1, for movement in synchronism with the tooling system stroke.

Linkage means 52 provides coordinated movement of shuttle arm 32 longitudinally into and out of the forming station in synchronism with operation of the press tooling (the latter in a direction transverse to the longitudinal movement of shuttle arm 32). For example, in one phase of the coordinated movements as shown in FIG. 2, a formed cup 38 is being separated from shuttle arm 32, at or near the end of the longitudinally-directed retraction movement of shuttle arm 32 as the tooling (24, 26) is completing formation of can body 28. Linkage means for carrying out the timing and synchronized movements taught herein can take various forms, details of such linkage structure are not essential to an understanding of the present invention.

As the press tooling starts movement(s) to release can body 28, shuttle arm 32 starts its forward-direction travel which will introduce its leading end 40 into the vicinity of the transversely-directed movement of press tooling 24, 26.

As the formed can body 28 is free of the press tooling (FIG. 3), shuttle arm 32 is at or near the end of its forward movement into the press and, the can body is attracted by and moves to saddle block means 44; the latter is mounted within opening 54 (FIG. 5) defined contiguous to the leading end 40 of shuttle arm 32.

During retraction, shuttle arm 32 moves in the longitudinally opposite direction from that of its introduction and there is relative movement between wiper arm means 34 and shuttle arm 32. In a specific embodiment, only shuttle arm 32 moves. Relative movement can be effected by movement of shuttle arm 32 and wiper arm 34 but, in a preferred embodiment, wiper arm 34 is stationary and only shuttle arm 32 need move relative to wiper arm 34 to effect separation of a can body from saddle block 44 for continued processing.

Shuttle arm 32 and wiper arm 34 are formed along portions of their lengths to interfit in elevation relative to the height of the can body; and, are positioned to interact in response to relative longitudinal movement between shuttle arm 32 and wiper means 34 for separation of a can body, after transfer from the vicinity of the tooling.

The approach location along the sidewall of a can body for attracting the can body to saddle block 44 is selected to facilitate stability and desired orientation of the can body during its transfer from the press and, also, to facilitate separation of the can body from saddle block 44 for delivery to means, such as conveyor 22, for continued movement in the processing line.

The saddle block 44 (on shuttle arm 32) and wiper surface 55 (on wiper arm 34) contact a can body at separate levels along the height of the can body sidewall. In a specific embodiment, saddle block 44 acts at, and comes into contact with a can body at approximately its mid-sidewall height. And, wiper surface 55 presents stripper arms which come into contact with the can body sidewall contiguous to such mid-sidewall height, preferably immediately below or above and below, such mid-sidewall height location contact of the saddle block. Thus, the shuttle arm and wiper arm structures interfit and interact in elevation, relative to can body sidewall height, as the shuttle arm is retracted in its longitudinal direction.

The wiper surface stripper arms extend with a major component of direction in such longitudinal direction toward the forming press such that the leading end of the wiper surface stripper arms make tangential contact with the can body being carried by the retracting shuttle arm. The can body is thus gradually separated from the saddle block 44 (by relative movement between shuttle arm 32 and wiper means 34) and moved in a lateral direction by wiper surface 55 (FIG. 4) as the can body contacts and moves along such wiper surface.

The locale (in the longitudinal direction of the processing line) for such wiping action is selected to deliver such can body onto a conveyor, e.g., a continuous-belt type, as such conveyor moves in the processing line as indicated in FIG. 4. The movement of the can body in the longitudinal direction of the pass line and the rate of movement of the surface of conveyor 22 in such longitudinal direction are preferably selected so that the can body does not tip or fall, but, rather remains and is held in the desired orientation as transferred onto a conveyor for further processing. In a specific embodiment, the can body is held with its axis oriented as formed, with the flange means at the open end of a steel can body being attracted and providing an area for supporting the can body along the surface of a magnetic conveyor means.

Separation of the can body from the saddle block is accomplished without abrupt, or orientation disrupting, lateral movement as such wiper surface arms extend in the longitudinally directed path of the shuttle arm to effect tangential contact with a can body sidewall. Such wiper surface separates such can body from the saddle block and directs it laterally toward conveyor means 22 for transfer to the processing line, as such processing continues after passage from the press station.

The transfer apparatus of the present invention enables transfer onto a conveyor processing line which, when viewed in plan, can be substantially a continuation of the pass line through the press or, offset laterally from such pass line.

Angled movement of the shuttle arm about its longitudinal axis enables continued movement of the can body along an extension of the pass line; or, the wiper surface configuration can shift the can body laterally, as it is stripped from the shuttle arm to a conveyor means moving with a major component of movement in such longitudinal direction. As taught in such specific embodiments, the positional relationship of such wiper surface 55 and the point of entry to the line of a continuous belt-type conveyor 22, from subsurface of the line, are selected, along with coordination of the linear rates of movement of the can body as it is being transferred and the conveyor surface to provide for stable transfer of the can body supported on its flange metal at its open end. For abrupt changes in direction, such as to a transversely directed conveyor, guide railings for the can bodies can be utilized after separation from the saddle block.

A significant contribution of the invention relates to enabling use of only a relatively minor portion of the periphery of a can body, which need be circumscribed by defined surface 42 of saddle block 44, while providing for rigidly holding the can body—notwithstanding rapid acceleration movement of the shuttle arm after attraction to the saddle block 44. The rapid retraction-directed movement from the vicinity of the press tooling tends to accentuate the effect of can body inertia (the can body is not moving longitudinally as forming is completed). However, with the saddle block means taught, the can body is attracted to and rigidly held so as to avoid vibrating or "hunting" for a stable orientation as the can body is being rapidly transferred from the vicinity of the tooling by the shuttle arm.

As a part of the present teaching, the saddle block means 44 for applying a source of energy for attracting and holding the can body, presents a configuration which provides for unobstructed access to the source of energy along the direction of the shuttle arm's (32) approach to the can body. Therefore, shuttle arm 32 can be moved longitudinally to the vicinity of a formed can body without mechanically knocking, pushing or physically contacting the can body before the can body is attracted by the source of energy to the can body conforming contour 42 of the saddle block 44. An open-faced access for attraction of a can body to the leading end of the shuttle arm is provided while still defining sufficiently circumscribing surface to assure that the can body is rigidly held and, moves from the tooling location in a desired orientation as the shuttle arm accelerates during retraction from the vicinity of the tooling.

As described earlier, in addition to there capabilities of attracting a can body, maintaining orientation and holding such can body, the saddle block contact with the can body is such that the can body can be released readily in a desired, gradual manner utilizing solely a unidirectional relative movement (FIG. 4) between shuttle arm 32 and angled wiper surface 55 for such release.

Referring to the pre-assembly view of FIG. 5, the saddle block 44 fits within the opening 54 defined at the leading end 40 of shuttle arm 32. Cover plate 56, utilizing fastener means, such as bolts 58, 59, secures saddle block 44 rigidly within opening 54 at such leading end of the shuttle arm. By means of such securing means, the saddle block can be readily changed for maintenance of its elements; or, for substitution of a selected saddle block with a differing surface contour (42) for adaptation to a differing sidewall can body to be transferred. In the specific embodiment of the saddle block of FIG. 6, the source of energy for attracting and rigidly holding a can body to contour 42 comprises a series of permanent magnets 60, 62, 64, 66 arranged in juxtaposition with flux path bars 70, 72, 74, 76, 78. One such flux path bar is located on each end of the stack; and, one such bar is intermediate next adjacent magnets. The magnets and the flux path bars are arranged such that each flux path bar establishes a magnetic flux path which is of opposite polarity to its next adjacent flux path bar in the stack.

As seen in the plan view of the FIG. 6 embodiment, the bars and magnets are arranged in a stack to present a portion of a circular configuration. The can body contact end of each of the flux path bars 70, 72, 74, 76, 78 defines a contour (designated as "42" in FIG. 4) which matches a portion of the periphery of a steel can body sidewall as formed by the press tooling. In the illustrated cylindrical sidewall can body, less than 90% of the periphery is utilized; approximately one-quarter of such periphery but preferably no greater than 90° of a cylindrical periphery can should be utilized. The flux bar contour is defined by inner ends (such as 80, 82) of each of the flux path bars 70, 72, 74, 76, 78.

Such end surfaces of the flux path members are machined to conform to such periphery and, define a matching-contour contact for the can body which is presented as the can is attracted to such saddle block.

The can body is held rigidly at a level, e.g. contiguous to its sidewall height midpoint, to facilitate transferring the can body and separating the can body along wiper surface 55 with desired stability and orientation. Open end down, with the longitudinal axis of the can body vertically oriented is a preferred orientation for can body fabricating purposes.

Referring to FIGS. 7 and 8, the permanent magnets are directionally magnetized in the direction of their depth dimension with their extended-area surfaces 92, 94 presenting opposite polarities.

Referring to FIG. 6, the north (N) polarity surface of magnet 60 confronts and contacts flux path bar 70 and the south (S) polarity surface of magnet 60 confronts and contacts the surface of flux path bar 72. Also note that the south "S" polarity surface of magnet 62 contacts the same flux path bar 72. "S" polarity is exhibited throughout the length of bar 72. Flux path bar 70 is of "N" polarity throughout its length. Continuing through the arc-shaped stack, the polarity of each of the flux path bars is as designated in FIG. 6; i.e. each flux path bar is of opposite polarity in relation to its next adjacent flux path bar.

The shortest gap for completing a flux path is between the inner, can body contact edges of the flux path bars; for example, between the inner edge 80 of bar 70 and the inner edge 81 of bar 72. The flux path through such gap is as indicated by interrupted lines, such as 83. The ferromagnetic steel can body (side-wall) concentrates the flux. The concentrated magnetic flux path between each of such bars is shown by interrupted lines in the remainder of FIG. 6.

Magnetic flux is concentrated between ends of the flux path bars by the steel can body in contact with such ends of the saddle block 44. The steel can body thus completes a plurality of high density flux paths which hold the can body rigidly in place after the can body is attracted to the saddle block.

A steel can body is held by the permanent magnet and multiple flux path arrangement of FIG. 6 such that the inertia of a can body, when the shuttle arm suddenly accelerates in its retraction direction of movement (moving away from the position at which the formed can body is attracted to the saddle block) does not destabilize the orientation of the can body. Such multiple flux path concentration teachings enable can bodies to be rapidly transferred from the press station while presented with desired orientation and stability for continued movement, handling or processing in the line.

TABULATED DATA

Typical values for a specific sheet metal can body embodiment are as follows:

| Sheet metal | Flat rolled steel |
|---|---|
| Gage | About 65 #/bb (.007") |
| Coating | Chrome-chromium chrome oxide (TFS steel) with organic polymeric coating on both surfaces |

Approximate dimensional values for a specific embodiment are:

| | |
|---|---|
| Can body side wall, typical diameters (211 = 2 and 11/16") | 211, 303 |
| Flange metal, typical diameters | From about 2¾" to about 3⅜" |
| Can body height | From about 3" to about 4" |
| Longitudinal length of shuttle arm 32 | 7½" |
| Stroke of shuttle arm 32 | 6¾" |
| Wiper arm 34 - over all length | 10 to 12" |
| Wiper surface 55: | |
| minor angle (between wiper surface and longitudinal direction) | about 20° at point of contact (rounded) |
| active wiper surface length | 6" |
| Permanent magnets 60, 62, 64, 66 | |
| Material | ARNOX #5 Ceramic (Available from Permag, Toledo, Ohio) |
| Cross Section configuration | Square |
| Dimensions | ¾" × ¾ × ¼"thick |
| Magnetizer: | |
| Model | MN EM 250 (Available from LDS Electronics, Troy, Michigan) |
| Flux Path Bars 70, 72, 74, 76, 78 | |
| Material | Mild Steel |
| Length | ⅞" |
| Width (Height) | ¾" |
| Thickness | ⅛" |

While specific materials, dimensional data nd configurations have been set forth in the above description, other values or materials could be substituted in the light of the concepts described and teachings set forth; therefore, for purposes of defining the scope of this invention for patent purposes reference shall be had to the appended claims.

We claim:

1. In a continuously-operating type of production line for sequentially fabricating sheet metal into can bodies utilizing a forming station in which movements of the forming tooling in such station are in a direction which is in transverse relationship to the longitudinal direction of travel for such can bodies in such line,
   transfer apparatus and linkage means between such forming tooling and such transfer apparatus for transferring a can body from the forming station, at completion of a forming stroke, in synchronism with operation of such forming tooling and, delivering such can body for travel in such longitudinal direction of such line at a location remote from movements of such forming tooling with such can body transfer taking place in a manner such that movements of such transfer apparatus do not impede the next sequential forming movements of such tooling in fabricating a subsequent work product in such line,
   such transfer apparatus being free of any mechanically-moving elements for clasping a can body for such transfer or for releasing such can body after transfer from such forming station and being limited such that any moving component part moves solely in a longitudinal direction so as to have a major directional component along such longitudinal direction of such line,
   such transfer apparatus including:
   an elongated shuttle arm which oscillates solely with a major component of direction along such longitudinal direction of can body movement in such line between the vicinity of such forming tooling and a location remote from movements of such forming tooling for deposit of such can body for subsequent handling in such line,
   saddle block means which are integral with and located at one longitudinal end of such shuttle arm,
   such saddle-block means presenting a source of energy for physically attracting a formed can body to such saddle block means and rigidly holding such can body in a desired orientation during movement of such shuttle arm from such vicinity of the forming tooling to such remote location,
   such saddle-block means being located at the leading end of such shuttle arm as such shuttle arm means is introduced by longitudinal direction movement from such remote location to such vicinity of such forming tooling,
   such shuttle arm oscillations in such longitudinal direction being synchronized with movements of such forming tooling so that sequential forming movements of such tooling are free of any impediment due to the movement of such shuttle arm,
   wiper arm means for separating such can body from such saddle-block means in response to solely unidirectional relative movement between such shuttle arm and such wiper arm means during a longitudinally-directed retraction oscillation of such shuttle arm from the vicinity of such forming tooling,
   such wiper arm means presenting
   a wiping surface which is in angled relationship to the longitudinal direction of movement of such shuttle arm so that such relative longitudinal-direction movement between the shuttle arm and the wiper surface of such wiper arm means causes separation of such can body from such saddle-block means.

2. The structure of claim 1 in which such relative movement between such shuttle arm and such wiper arm means is accomplished
   solely by movement so such shuttle arm while such wiper arm means is stationary.

3. The structure of claim 1 in which
   such can body is separated from such saddle block means onto conveyor means for continued conveyance of such can body in such can line.

4. The structure of claim 1 in which such wiper means is stationary, and such shuttle arm moves in such longitudinal direction in synchronism with movements of such forming tooling, and such shuttle arm and wiper surface interfit and interact in elevation along the sidewall height of such can body.

5. The apparatus of claim 1 in which
such saddle block means for physically attracting a formed can body and rigidly holding it at the leading end of such shuttle arm in desired orientation for removal from the vicinity of such forming tooling, includes
can body contact means for confronting such can body,
such can body contact means presenting a surface contour which matches at least a portion of the external peripheral contour of such can body as delivered from such forming tooling.

6. The structure of claim 5 in which
such sheet metal can body has a cylindrical peripheral contour and such can body contact means presents a portion of a cylindrical surface of a diameter matching that of such can body peripheral contour,
such can body contact surface being formed from separable elements integrally held within such saddle block means to present such matching cylindrical surface, and, in which
such cylindrical surface portion does not exceed 90° of the cylindrical peripheral contour of such can body.

7. The structure of claim 6 in which
such can body is held upright with its longitudinal axis in perpendicularly transverse relationship to such longitudinal direction of movement of such can body line.

8. The apparatus of claim 7 further including
conveyor means at such location remote from such tooling,
such conveyor means moving with a major component of movement in such longitudinal direction of such can body line, and
such can body is formed with its central axis oriented perpendicularly transverse to such longitudinal direction of movement of the can body line,
such can body presenting flange metal at its open end confronting such conveyor means for support of such can body during continued movement of such can body subsequent to separation from such saddle block means by such wiper means.

9. The structure of claim 8 in which
such conveyor means is horizontally oriented for movement in such longitudinal direction of such can line, and
such can body, in confronting siuch longitudinal direction of movement, has its axis vertically oriented with such flange at its open and facing such conveyor means.

10. The apparatus of claim 2 in which
such saddle-block means is removably secured to such shuttle arm so as to enable substitution of other saddle block means and selection of matching contour surfaces of differing dimensions.

11. The structure of claim 1 for removing steel can bodies as dislodged from such forming tooling, in which
such source of energy for attracting such a steel can body to such shuttle arm comprises permanent magnet means.

12. The structure of claim 11 in which such permanent magnet means comprise
a plurality of individual permanent magnets, oriented in a stack in such saddle-block means, in juxtaposition with
a plurality of shaped bars which comprise magnetic flux paths, with one such flux path bar confronting each pole of each of such magnets,
such permanent magnets and flux path bars being arrayed and oriented to present such can body contact surface for confronting such can body, and in which
the contour of such can body contact surface is coordinated with at least a portion of such peripheral surface contour of such formed can body.

13. The structure of claim 12 in which
each such permanent magnet is separated by a flux path bar,
a flux path bar is located at the end surface pole of such permanent magnet located at each end of such stack, and
such flux path bars are elongated with longitudinal ends of such bars presenting such can body contact contoured surface for matching at least a portion of such can body peripheral surface.

14. The structure of claim 12 in which
such stack of permanent magnets and flux path bars is arranged to have ends of such bars forming a curvilinear contour for matching contact with a portion of such peripheral contour of such steel can body to be removed from the vicinity of such forming tooling.

15. The apparatus of claim 14 in which
such flux path bars are arranged in relationship with such permanent magnets such that ends of such flux path bars form an arc for contacting such can body,
such arc presenting a portion of a cylindrical configuration periphery.

16. The apparatus of claim 13 in which
such plurality of permanent magnets and flux path bars are arranged so that as part of the matching contour surface presented by longitudinal ends of such flux path bars, each such bar has a polarity which is of opposite polarity in relation to the polarity of its next adjacent flux path bar confronting such can body,
such arrangement providing for completing the flux path between such next adjacent, opposite polarity poles through such steel can body so as to rigidly hold such can body to such bars by such permanent magnets notwithstanding rapidly accelerating movement of such saddle block means from the vicinity of such forming tooling by such shuttle arm.

17. The apparatus of claim 16 in which
such permanent magnets are magnetized so that an extended surface area at each end of each magnet is polarized, and
each such extended surface area of each permanent magnet confronts a flux path bar so as to establish such opposite polarity relationship of next adjacent longitudinal ends of such flux path bars confronting such can body.

* * * * *